United States Patent
Danielson

[15] 3,658,637
[45] Apr. 25, 1972

[54] DIALKYL OXALATE STABILIZATION OF POLYESTER FIBER-RUBBER LAMINATE AGAINST HEAT AND CHEMICAL DEGRADATION

[72] Inventor: Arthur C. Danielson, Royal Oak, Mich.
[73] Assignee: Uniroyal, Inc., New York, N.Y.
[22] Filed: Mar. 17, 1969
[21] Appl. No.: 807,911

[52] U.S. Cl.................161/231, 156/297, 260/3, 260/23.7, 260/45.85, 260/799, 260/836, 260/873, 260/887
[51] Int. Cl..............B32b 27/36, B32b 31/00, C08c 13/08, C08c 15/00, C08f 45/58, C08g 39/10
[58] Field of Search.............260/45.7, 45.8, 45.85, 45.9, 260/45.95, 3, 9, 174, 873; 156/247; 161/231, 239; 152/330; 35/260–275, 799

[56] References Cited

UNITED STATES PATENTS

| | | | |
|---|---|---|---|
| 3,411,970 | 11/1968 | Perrin | 161/231 |
| 3,411,980 | 11/1968 | Leshin | 161/183 |
| 3,419,463 | 12/1968 | Timmons | 161/231 |
| 3,487,056 | 12/1969 | Albert et al. | 260/795 |
| 3,506,624 | 4/1970 | Behrens | 260/775 |

FOREIGN PATENTS OR APPLICATIONS

| | | | |
|---|---|---|---|
| 531,286 | 10/1956 | Great Britain | 260/775 |

OTHER PUBLICATIONS

Rubber World: Materials and Compounding Ingredients for Rubber, 1968 Ed., " Chemical Heat Stabilizers," pp. 129–149, & 109, 111

Primary Examiner—Harold D. Anderson
Assistant Examiner—Edward Woodberry
Attorney—James J. Long

[57] ABSTRACT

Polyester cord reinforcement in rubber (e.g. in tires) is rendered more resistant to deterioration upon heat aging if the rubber stock contains certain deterioration preventing substances which include certain aldehydes, esters (e.g. diethyl oxalate), lactones, lactides, ketones, keto esters, halides, salts, orthosilicates, orthoformates, silanes, sulfites, isocyanates, epoxides, and anhydrides, as well as polymers of such substances.

4 Claims, No Drawings

DIALKYL OXALATE STABILIZATION OF POLYESTER FIBER-RUBBER LAMINATE AGAINST HEAT AND CHEMICAL DEGRADATION

BACKGROUND OF THE INVENTION

1. Field of the Invention

This invention relates to a method of stabilizing polyester fiber against heat and chemical degradation in polyester fiber-rubber laminates, and to laminates made by such method.

2. Description of the Prior Art

Canadian Pat. No. 775,535, Timmons, Jan. 9, 1968, improves the adhesion of polyester fiber to rubber by applying certain alkyl esters of aromatic acids to the fiber. In the present invention the deterioration preventing substance is incorporated in the rubber stock itself.

South African Pat. No. 66/6979, du Pont, Nov. 18, 1966, discloses polyester-reinforced elastomeric articles in which the elastomer is highly permeable to moisture and is free of accelerators which are amines or capable of yielding amines. The present invention makes it unnecessary to observe any restrictions as to moisture permeability of the stock (i.e., ordinary conventional stocks can be used) and makes it unnecessary to restrict oneself as to type of accelerator (i.e., the common, economical accelerators, even these which are amines or capable of yielding amines, can be used).

SUMMARY OF THE INVENTION

The invention is based on the surprising discovery that degradation of polyester fiber, particularly as a result of exposure to elevated temperature for a prolonged period of time within a rubber stock, can be alleviated by the addition of certain deterioration preventing substances. Thus, in accordance with the invention, certain chemicals described below, present in a rubber stock adhered to polyester fiber, have been found to be effective stabilizers which resist the progressive loss in fiber strength and loss of adhesion associated with continued exposure to high temperatures under conditions of use, such as are encountered in service in pneumatic tires.

DESCRIPTION OF THE PREFERRED EMBODIMENTS

Any polyester fibers known to the art to be useful for reinforcing rubber can be used in the invention. Typically the polyester is a "linear terephthalate polyester" as that term is defined in Daniels U.S. Pat. No. 3,051,212. Examples of such polyester fibers are those described in the Daniels patent and in Chantry U.S. Pat. No. 3,216,187; I am not limited to using fibers of the type described in those patents but can use any polyester fiber suitable for reinforcing rubber. Such polyesters include those described, for example, in Whinfield and Dickson U.S. Pat. No. 2,465,319, dated Mar. 22, 1949, and the best-known commercial example is polyethylene terephthalate, which will be used in the examples to illustrate the invention. Another example is polyethylene terephthalate-isophthalate copolymer.

The invention finds particular applicability in polyester in the form of textile fibers, for example in the form of polyester tire cord or similar polyester filamentary material commonly used to reinforce such rubber articles as pneumatic tires, timing belts, conveyor belts, hose, footwear, coated fabrics, etc.

In many instances in prior practice it has been observed that the polyester is not as stable, in the environment in which it is used, as would be desirable. In particular it has been observed that in those applications where the polyester is subjected to elevated temperature, whether by external heating as in the case of a vulcanization process or because of internal generation of heat as in a rolling pneumatic tire, a loss in desirable properties of the system can take place. In polyester cord-rubber laminates this is frequently manifested by an impairment of the reinforcing effectiveness of the textile, and particularly by premature weakening or failure of the cord and/or of the adhesive bond between the polyester and the rubber. As is recognized in South African Pat. No. 66/6979 referred to above, particular difficulty is experienced in this respect in those rubber stocks which contain an amine, or a substance which yields an amine. Thus, conventional rubber accelerators which are amines, or which react or break down to yield amines in the rubber stock, are believed to be a source of difficulty in ordinary practice. Other potential sources of amines in the rubber stock are such compounding ingredients as certain chemicals sometimes added to the rubber to promote adhesion between the rubber stock and the textile. Stabilizers, antioxidants or antiozonants are also potential sources of amines, although usually weaker amines and probably less damaging than the stronger amines from accelerators.

The invention contemplates the stabilization of the polyester-rubber laminate against undesired changes by mixing certain deterioration preventing substances into the rubber stock which is to be laminated to the polyester. This may be accomplished with the aid of the usual rubber mixing equipment at any appropriate stage during the compounding of the rubber, for example on a differential roll mill or in an internal mixer such as a Banbury mixer. Surprisingly small amounts of the deterioration preventing substance are capable of yielding noticeable improvement. Thus, as little as 0.1 or 0.2 part of such substance may be used, per 100 parts by weight of RHC (rubber hydrocarbon) but ordinarily it is preferred to use somewhat more of the substance, say 0.5 to 1 or 2 parts. There is no general critical upper limit on the amount of deterioration preventer that may be used, but for typical purposes it is frequently unnecessary to use more than 2 or 3 parts. Larger amounts may sometimes be used if desired but for reasons of economy not more than about 5 or 10 parts would ordinarily be employed.

The most appropriate amount of deterioration preventer in any given case may be expressed in terms of stoichiometric equivalents of deterioration preventer (in terms of theoretical ability to react with amine), per equivalent of amine present in the rubber stock or formed in the rubber stock. Thus, for each equivalent of amine present or potentially present in the rubber stock, there is added preferably at least about one equivalent of deterioration preventer, actually more preferably at least a slight excess of deterioration preventer (e.g., 1.1 to 1.5 or more equivalents). In calculating the equivalents of amine potentially present in the stock it is particularly important to take the amount of accelerator into account, since the accelerator is ordinarily the source of the strongest or most damaging amine, and to a lesser extent such materials as amine antioxidants (usually weaker and less damaging amines) may be taken into account.

While it is not desired to limit the invention to any particular theory of operation, it is believed to be possible that the observed benefits of the deterioration preventing substance are the consequence of the ability of the substance to somehow counteract the deleterious influence of certain substances in the rubber stock on the polyester and/or the adhesive which bonds the polyester to the stock. Thus, it is believed to be possible that at least some of the undesirable changes which take place in the polyester, and/or the adhesive bond between polyester and rubber, are at least in part caused by an undesirable action of amines or amine-yielding substances frequently present in ordinary rubber compounds. Difficulties such as loss of tensile strength and/or of adhesion may be caused by aminolysis or basic hydrolysis of the polyester cord and/or the adhesive coating, particularly at elevated temperatures. Whatever the explanation, the observed fact is that the herein-described deterioration preventing substances, when employed in accordance with the invention, are capable of substantially arresting or slowing down the undesired changes that occur in the reinforced rubber article during prolonged or repeated exposure to elevated temperature. Whether this is entirely due to removal of amines from the scene by the deterioration preventing material, or in part due to some other unknown factors, is not certain, particularly in view of the fact that numerous substances, apparently very similar to the presently employed deterioration preventing substances as far as apparent theoretical ability to react with or neutralize amines is concerned, are not operable in the present invention. Thus, every substance which one might think to be a potential amine-acceptor or amine-scavanger by reason of its structure and chemical properties, is not necessarily by any means an effective deterioration preventer for the present purposes.

Desirable characteristics of the deterioration preventing substance include the ability to react, under the conditions prevailing in a rubber stock, with harmful amines present in or generated in the stock, and thus convert such amines into relatively stable, nondeleterious forms in which the amine becomes bound up and is not readily liberated again in the presence of heat (e.g., heat applied during vulcanization; heat generated within the article in use). The chemical preferably should not have an undue adverse effect on the cure rate; thus, highly acidic chemicals will interfere with cure and are undesirable. The chemical should not have marked plasticizing action on the polyester, and should not react to form plasticizer. It is preferred that the deterioration preventer be substantially non-volatile, so that it tends to remain in the rubber stock, rather than become lost over a period of time by vaporization. From this standpoint polymers are particularly suitable as deterioration preventers. The deterioration preventer should preferably be soluble in the rubber stock.

Substances found to be effective as deterioration preventers for purposes of the invention include certain aldehydes, esters, lactones, lactides, ketones, keto esters, halides, salts, orthosilicates, orthoformates, silanes, sulfites, isocyanates, epoxides, and anhydrides, as well as polymers of such substances.

More particularly, the deterioration preventing substances effective in the invention are benzaldehyde, salicylaldehyde, 3-chloromethylsalicylaldehyde, 3-chloromethyl-5-hydroxybenzaldehyde, furfural, m-hydroxybenzaldehyde, p-hydroxybenzaldehyde, 2,4-dihydroxybenzaldehyde, 2,4-dimethoxybenzaldehyde, 2,3-dimethoxybenzaldehyde, vanillin, veratal-dehyde, 5-methoxysalicylaldehyde, cinnamic aldehyde, 2-ethyl-4-hexanal, p-isopropylbenzaldehyde, 2,2-dimethyl-3,4-octadienal, terephthaldehyde, dialkyl oxalates (such as diethyl oxalate, dibutyl oxalate, dioctyl oxalate, etc.), butyl butyrate, butyl lactate, ethyl carbonate, ethyl succinate, dimethyl terephthalate, 2-ethylhexyl acrylate, ethyl p-toluenesulfonate, triacetin, methyl salicylate, butyrolactone, 2,2,4-trimethyl-pentenolactone, linear lactide polymer cyclic lactide polymer, tetramethyl-1,3-butanedione, benzil, benzoin, 1,3-cyclohexanedione, p-quinone, dimedone, 1,3-dihydroxypropanenone, dl camphor, dehydroacetic acid, 2,5-dicarbethoxy-1,4-cyclohexandione, acetoacetic ester, butyl pyruvate, triglycol dichloride, benzyl chloride, p-xylene dichloride, alpha,alpha, alphatrichlorotoluene, 1,4-bis(trichloromethyl)benzene, aniline hydrochloride, dianiline-1,5-napthalenedisulfonate, zinc p-toluenesulfonate, zinc benzenesulfonate, sodium 2-formyl benzenesulfonate, tetraethyl orthosilicate, tetra(2-ethylhexyl) orthosilicate, tetra(2-ethylbutyl) orthosiclicate, tri-isodecyl orthoformate, vinyltriethyoxy silane, 2-nitro-2-methyl-1,3-propanediol sulfite, m-phenylene diisocyanate, phenylisothiocyanate, vinyl-cyclohexene dioxide, styrene oxide, epoxy resin (e.g., epichlorohydrin-bisphenol A condensate), isatoic anhydride, dodecenyl succinic anhydride, octadecenyl succinic anhydride, polyglyoxal, polyvinyl acetate, dialdehyde starch, and poly(methyl vinyl ketone).

Preferred deterioration preventers are the dialkyl oxalates (particularly diethyl oxalate, dibutyl oxalate, dioctyl oxalate), tri-isodecyl orthoformate, benzaldehyde, furfural, 1,3-cyclohexanedione, 2,5-dicarbethoxy-1,4-cyclohexanedione, and dialdehyde starch.

When applying the invention to the manufacture of pneumatic tires it is particularly preferred to incorporate the deterioration preventer in the carcass stock.

The invention is applicable to any kind of rubber, natural or synthetic, but has particular reference to the unsaturated sulfur-vulcanizable hydrocarbon rubbers, whether natural or synthetic. These may be described as diene polymers, and include not only homopolymers of conjugated diolefins, e.g., polybutadiene, whether of high cis content or otherwise, whether solution-prepared or emulsion-prepared; polyisoprene (natural or synthetic) etc., and equivalent homopolymers such as polychloroprene, but also copolymers, such as copolymers of diolefins with one or more copolymerizable monoethylenically unsaturated monomers such as styrene, acrylonitrile, vinyl pyridine, ethyl acrylate, etc. The copolymers may be of the highly unsaturated kind (e.g., 50 percent or more diene) as in SBR, or of the low unsaturation kind as in copolymers of isoprene or butadiene with isoolefins such as isobutylene (butyl rubber), or copolymers of at least two different alpha-monoolefins [e.g., ethylene, propylene, butene-1] with one or more polyenes, especially the bridged ring or open-chain non-conjugated dienes such as dicyclopentadiene, ethylidene norbornene, methylene norbornene, cyclooctadiene, as well as tetrahydroindene, 1,4-hexadiene, or similar monomers containing at least two olefinic double bonds [known as "EPT" or "EPDM"]. If desired, mixtures of rubbers may be employed, such as blends of NR with cis-BR, blends or NR, cis-BR, and SBR, blends of butyl with EPDM, NR-SBR blends, etc.

The rubber stock in which the deterioration preventer is incorporated in accordance with the invention is compounded for sulfur vulcanization (that is, it will contain sulfur or a sulfur-yielding curative), using a conventional accelerator of sulfur vulcanization. Such accelerators include the aryl substituted guanidines, aldehydeamine condensation products, dithiocarbamates, thiuram disulfides, and benzothiazole sulfenamides. (Cf. Davis & Blake "Chemistry & Technology of Rubber" Reinhold, 1937, pp. 294–303). Some specific examples are 2-(morpholinothio)-benzothiazole, N-cyclohexyl-benzothiazole-2-sulfenamide, N,N-diisopropylbenzothiazole-2-sulfenamide, N-tert-butlbenzothiazole-2-sulfenamide, piperidinium pentamethylenedithiocarbamate, tetramethylthiuram disulfide, zinc dibutyl dithiocarbamate, and diphenyl guanidine. More than one accelerator may be used. Such further optional ingredients as activators, processing aids, tackifiers, lubricants, retarders, antioxidants, antiozonants, peptizers, extender oils, etc. may also be present. In appropriate cases, fillers or pigments will be used, particularly reinforcing fillers such as carbon black or silica. The stock may include adhesion-promoting chemicals, such as for example those disclosed in Belgian Pat. No. 683,718, July 6, 1966, U.S. Rubber Co.

The invention finds particular applicability in rubber stocks containing accelerators which are amines or which yield amines, since those types of accelerators normally present the greatest difficulties from the standpoint of deterioration of the rubber-polyester fiber laminate.

The textile material to which the invention is applicable is polyester fiber in various forms, whether mono-filaments or multi-filaments, plied yarns, cords, staple fibers, fabrics of various kinds whether cord fabrics or square woven fabrics, leno weaves, non-woven bats and the like, etc.

Lamination of the compounded rubber stock, containing the deterioration preventer in accordance with the invention, to the polyester fiber, may be accomplished in any conventional manner, for example by calendering the stock onto the polyester, or by extrusion or injection or compression molding of the stock onto the polyester. Those skilled in the art will be able to select a laminating procedure appropriate to the particular article being manufactured.

Ordinarily an appropriate conventional adhesive substance will be applied to the polyester fiber prior to the lamination step. Suitable conventional adhesives include various cements, dispersions or emulsions, and the like. These may be deposited on and/or impregnated into the fabric by various means such as spraying, dipping, painting, spreading, etc. to form an adhesive deposit on the surface of the fiber and/or in the interstices of the fiber. Suitable conventional adhesives include those based on rubber latex, particularly a vinylpyridine latex (especially a latex of a butadiene vinylpyridine copolymer rubber or a butadiene-styrenevinylpyridine copolymer) with or without another latex such as SBR latex and/or natural rubber latex. Butadiene-acrylonitrile copolymer latex is useful, as are butyl latex and EPDM latex. The adhesive qualities of the latex are improved if partially reacted resorcinolformaldehyde resin is also dissolved or dispersed in the composition (frequently along with additional formaldehyde or a formaldehyde-yielding substance), in accordance with well-known practice. Isocyanates, including blocked isocyanates and isocyanate dimers, are frequently helpful adhesive ingredients as are epoxy compounds, polyimines, etc., which may be used in various combinations or in succession.

After drying the adhesive-treated polyester, and, in appropriate cases, after subjecting the adhesive coated fiber to elevated temperature to cure the adhesive, lamination to the rubber stock containing the deterioration preventer of the invention is undertaken, and thereafter the assembly is subjected to conventional vulcanizing conditions to cure the rubber stock in contact with the embedded textile reinforcement.

Surprisingly, it is found, in many carefully controlled experiments conducted with and without the deterioration preventer in the rubber stock, that the strength of the polyester is retained to a greater extent when the deterioration preventer of the invention is used.

Perhaps even more significantly, it has been demonstrated that laminates subjected to repeated or prolonged exposure to elevated temperatures (such as prevail in a pneumatic tire in use, wherein repeated rapid flexing of the tire generates considerable internal heat, especially at high speed and/or under heavy load) do not deteriorate as rapidly, when the deterioration preventer of the invention is present in the rubber stock, in comparison to otherwise identical laminates in which the deterioration preventer is absent. This may be demonstrated by conventional tests, including tensile tests on the cords and ply-separation tests carried out on laminates that have been subjected to heat aging conditions for extended periods of time in accordance with conventional evaluation procedures. Laboratory results of this kind on adhesion test pads have been confirmed by tests on actual pneumatic tires, conducted on test wheels and on the road. Polyester-reinforced tires made of carcass stock containing the deterioration preventer of the invention are cooler running than tires from which the deterioration preventer of the invention is absent. This greatly prolongs the useful life of the tires.

As indicated previously, it is thought possible that the benefits of the deterioration preventer are associated with the ability to in effect remove from the scene or neutralize deleterious substances present in the rubber stock and/or the adhesive, or which are normally generated or liberated, particularly from accelerators, especially at elevated temperatures, and/or adhesion-promoting ingredients present in the rubber stock and/or in the adhesive formulation.

That certain amine substances, for example, added to rubber stock, seriously degrade the tensile strength of polyester cord reinforcement upon heat aging of the laminate, has been demonstrated by carefully conducted experiments. Primary amines are much more damaging than secondary amines; tertiary amines are least damaging. Cyclohexylamine (an amine known to be released from the common accelerator N-cyclohexyl-2-benzothiazolesulfenamide), when added to the rubber stock, results in severe loss in tensile strength of the cord.

Accordingly, the invention has particular utility in preventing the deterioration of polyester textile reinforced rubber laminates in which the rubber stock or the adhesive, or both, contain compounding ingredients or adhesive components which are harmful, such as amines, or which tend to liberate or generate harmful substances such as amines, especially under vulcanizing conditions or during heat aging.

The following examples, in which all quantities are expressed be weight unless otherwise indicated, will serve to illustrate the practice of the invention in more detail.

EXAMPLE I

This example illustrates how a preferred deterioration preventer, diethyl oxalate, improves the stability, particularly from the standpoint of rentention of the strength of the adhesive bond, of a polyester-rubber laminate.

Rubber stocks are prepared by mixing 100 parts of natural rubber, 33 parts of carbon black, 10 parts of zinc oxide, 2 parts of stearic acid, 5 parts of pine tar softener, 1.5 parts of antioxidant BLE (acetone-diphenylamine condensation product), 0.4 part of accelerator Santocure SNS (N-tertiary-butyl-2-benzothiazolensulfenamide), 3.5 parts of sulfur, 1.25 parts of resorcinol, and 1.8 parts of 1-aza-5-hydroxymethyl-3,7-dioxobicyclo (3.3.0) octane, and diethyl oxalate in the following amounts to make four different test recipes (A to D):

RECIPES

| | A | B | C | D |
|---|---|---|---|---|
| Diethyl oxalate (parts) | — | 0.50 | 1.00 | 2.00 |

Polyethylene terephthalate polyester tire cords are prepared in conventional manner for lamination with the foregoing stocks. For this purpose, the cords may be treated by a double dip adhesive system disclosed in Canadian Pat. No. 777,779, Kalafus et al., Feb. 6, 1968, Example 1(as described therein in connection with "Tire Cord A").

Laminates of thus-treated polyester cords to the described rubber stocks may be prepared in conventional manner for the standard "H" adhesion test described in Ind. Rub. World, Vol. 114, page 213 (1946) and in United States Department of Agriculture Bulletin AIC-99 (1945), by Lyons et al. The laminates may be cured at 293° F. for 45 minutes. After aging the cured test specimens in air at 250° F. for 8 hours, the "H" adhesion test is performed at a temperature of 250° F., with the following results, expressed in pounds:

RECIPE

| | A | B | C | D |
|---|---|---|---|---|
| 250° "H" Adhesion (lbs.) | 13.2 | 16.7 | 16.0 | 18.7 |

It will be seen that in Recipes B, C and D, which represent the practice of the invention, the heat-aged adhesion values, measured at elevated temperature are remarkably improved in comparison to Recipe A not containing the deterioration preventer of the invention, diethyl oxalate.

EXAMPLE II

This example demonstrates the ability of another preferred deterioration preventer, acetoacetic ester, to protect against loss of polyester cord strength upon heat aging in a laminate to rubber stock.

The following rubber compounds are prepared by mixing 35 parts of natural rubber, 20 parts of cis-1,4-polybutadiene (cis content of, e.g., 85 percent), 67.5 parts oil-extended SBR (containing 45 parts SBR [styrene content of, e.g., 23 percent], 22.5 parts petroleum hydrocarbon extender oil [e.g., naphthenic type]), 55 parts of carbon black, 10 parts of zinc oxide, 1 part of stearic acid, 7.5 parts of pine tar oil, 0.5 part of antioxidant (phenylbetanaphthylamine-acetone low temperature reaction product), 3 parts of sulfur, 0.9 part of N-tertiarybutyl-2-benzothiazole sulfenamide, 1.5 part 2-nitro-2-methylpropanol and 1.5 part of partially reacted resorcinol-formaldehyde resin (see, for example, U.S. Pat. No. 3,364,100, Danielson, Jan. 16, 1968, col. 5, lines 26–28), with and without acetoacetic ester as shown in the following test recipes A and B:

RECIPES

| | A | B |
|---|---|---|
| Acetoacetic ester (parts) | 0 | 2.0 |

Polyethylene terephthalate polyester tire cords may be treated with adhesive and laminated with the rubber stocks as in Example I to make test specimens which are cured at 330° F. for 8 minutes. The strip adhesion of the cords is measured at 250° F. in the unaged ("green") samples, and after aging treatments of the laminates in air at 350° F. for 1 hour, and 375° F. for 1 hour, with the results shown in the following table. The strength of the cords is also shown in the table.

RECIPE

|  | A | B |
|---|---|---|
| Adhesion (lbs. at 250° F.) |  |  |
| green | 34 | 37 |
| aged 350° F. 1 hour | 19 | 21 |
| aged 375° F. 1 hour | 9 | 14 |
| Cord strength (lbs.) |  |  |
| unaged | 35 | 35 |
| aged 350° F. 1 hour | 30.3 | 31.7 |
| aged 375° F. 1 hour | 26.7 | 27.3 |

It will be seen from the above table that recipe B of the invention containing the deterioration preventer, acetoacetic ester, results in much better initial adhesion, and better retention of adhesion upon heat aging. Also quite remarkable are the significantly higher values of cord strength after aging in recipe B, as compared to recipe A which does not contain the deterioration preventer of the invention.

EXAMPLE III

This example illustrates application of the invention to a pneumatic tire. Two carcass stocks are prepared, one containing diethyl oxalate as a deterioration preventer, and the other containing no diethyl oxalate, according to the following recipes:

Parts by Weight

|  | Carcass Stock A (Control) | Carcass Stock B (Invention) |
|---|---|---|
| NR | 35 | 35 |
| Cis-BR (e.g., 85% cis content) | 20 | 20 |
| SBR(45 polymer [e.g., 23% styrene]22.5 petroleum hydrocarbon extender oil [e.g., naphthenic]) | 67.5 | 67.5 |
| FEF carbon black | 55 | 55 |
| Zinc oxide | 10 | 10 |
| Pine tar oil | 6.75 | 6.75 |
| Stearic acid | 1.0 | 1.0 |
| Antioxidant (acetone-phenyl-beta-napthylamine) | 0.5 | 0.5 |
| Resorcinol-formaldehyde resin | 0.75 | 0.75 |
| Tris (hydroxymethyl)nitromethane | 1.5 | 1.5 |
| Benzothiazole disulfide | 1.25 | 1.25 |
| Diphenyl guanidine | 0.3 | 0.3 |
| Sulfur | 3.0 | 3.0 |
| Diethyl oxalate | — | 2.0 |

Conventional sidewall stock and tread stock is provided, and 4-ply pneumatic tires size 8.25–14 are built using Dacron polyethylene terephthalate polyester tire cord, and a conventional polyester tire cord adhesive (e.g., see Example I). The cured tires are mounted and inflated to 32 p.s.i. pressure. The tires are run on test wheels where they are subjected to a load of 1,620 pounds, and run for 2 hours at 50 m.p.h., followed by 75 m.p.h. The temperature attained within the tire is measured after 4 hours running, by inserting a thermocouple needle into the tire to a depth of .65 inch. Typical test results are as follows:

|  | Temp. Attained |
|---|---|
| A series (control — no diethyl oxalate) | 285° F. |
| B series (diethyl oxalate) | 272° F. |

It will be seen that the A series of tires, made with the control carcass stock A containing no diethyl oxalate, develop a much higher temperature in use than the B series made with carcass stock B containing diethyl oxalate which run much cooler and last a much longer time.

In another test, known as the stepped up high speed test, tires are run 60 m.p.h. for 1 hour, 70 m.p.h. for 1 hour, 80 m.p.h. for 1 hour, 90 m.p.h. for 1 hour and then 5 m.p.h. increases in speed every two hours until failure occurs or 125 m.p.h. is attained. Typical results in this test are as follows:

|  | Temp. Attained | Max Speed | Failure at Max Speed |
|---|---|---|---|
| A series ( no diethyl oxalate) | 323° F. | 95 | 0.2 |
| B series (diethyl oxalate) | 242° F. | 115 | 1.6 |

EXAMPLE IV

This example illustrates the effectiveness of a number of other deterioration preventers, for reducing the loss of strength of polyester cords exposed to a rubber, containing an amine, at elevated temperature. This effectiveness is demonstrated by mixing the following masterbatch:

|  | Parts by Weight |
|---|---|
| NR | 35.00 |
| Cis BR (e.g., 85% cis content) | 20.00 |
| SBR (45 polymer [e.g., 23% styrene] 22.5 petroleum hydrocarbon extender oil e.g., naphthenic) | 67.50 |
| FEF Carbon Black | 55.00 |
| Zinc Oxide | 10.00 |
| Stearic Acid | 1.00 |
| Pine Tar Oil | 7.50 |
|  | 196.00 |

Portions of this stock weighing 250 grams are employed in the tests. A control stock, identified as Control A, contains no amine or deterioration preventer; another control, identified as Control B, contains 2.5 grams of an amine, cyclohexylamine (0.01 molar concentration), in 250 grams of stock. Each deterioration preventer to be tested is mixed in with a 250 gram portion of the masterbatch containing 2.5 grams of cyclohexylamine. In each case, the amount of deterioration preventer employed is 10 percent in excess of the calculated amount required to react with all of the cyclohexylamine. The stock is sheeted to a 40 gauge thickness. A sheet of the stock is wrapped around a metal cylinder about the size of a quart can. Polyester cord is wrapped around the rubber layer, and another layer of the stock is wrapped around the cords. Thus the cords are surrounded by the rubber stock. The whole assembly is wrapped in aluminum foil to seal it, and placed in an oven for 16 hours at 340° F. Thereafter the cord is carefully removed, and the tensile strength of the cord is determined in an Instron tensile testing apparatus at a jaw separation speed of 12 inches per minute. Results obtained with Control A (no amine; no deterioration preventer), Control B (cyclohexylamine; no deterioration preventer), and various test stocks (cyclohexylamine plus deterioration preventer), are shown in Table I.

TABLE I.—PERCENT OF ORIGINAL CORD STRENGTH RETAINED IN RUBBER STOCK WITH VARIOUS DETERIORATION PREVENTERS

| Deterioration preventer | Amount of deterioration preventer (g.) | Percent of original strength retained |
|---|---|---|
| Control A; no amine in stock; no deterioration preventer |  | 83 |
| Control B; cyclohexylamine in stock; no deterioration preventer |  | 42 |
| Benzaldehyde | 2.9 | 65 |
| Salicylaldehyde | 3.35 | 60 |
| 3-ClCH$_2$-salicylaldehyde | 4.7 | 67 |
| 2-ClCH$_2$-5-OH-benzaldehyde | 4.7 | 65 |

| Deterioration preventer | Amount of deterioration preventer (g.) | Percent of original strength retained |
|---|---|---|
| Furfural | 2.7 | 69 |
| m-OH-benzaldehyde | 3.3 | 52 |
| p-OH-benzaldehyde | 3.3 | 80 |
| 2,4-di-OH-benzaldehyde | 3.8 | 60 |
| 2,4-di-OCH$_3$-benzaldehyde | 4.6 | 71 |
| 2,3-di-OCH$_3$-benzaldehyde | 4.6 | 60 |
| Vanillin | 4.2 | 69 |
| Veratraldehyde | 4.6 | 77 |
| 5-OCH$_3$-salicylaldehyde | 4.2 | 74 |
| Cinnamic aldehyde | 3.6 | 63 |
| 2-ethyl-4-hexanal | 3.5 | 66 |
| p-Isopropyl benzaldehyde | 4.3 | 74 |
| 2,2-dimethyl-3,4-octadienal | 4.2 | 77 |
| Terephthaldehyde | 3.9 | 77 |
| Butyl butyrate | 3.9 | 54 |
| Butyl lactate | 4.0 | 52 |
| Ethyl carbonate | 1.6 | 52 |
| Ethyl succinate | 2.0 | 49 |
| Dimethyl terephthalate | 2.7 | 63 |
| Diethyl oxalate | 2.0 | 67 |
| Dibutyl oxalate | 2.8 | 67 |
| Dioctyl oxalate | 3.4 | 65 |
| 2-ethylhexyl acrylate | 4.7 | 66 |
| Ethyl p-toluenesulfonate | 5.5 | 57 |
| Triacetin | 1.0 | 48 |
| Methyl salicylate | 4.2 | 66 |
| Butyrolactone | 2.4 | 54 |
| 2,2,4-trimethyl-penteno lactone | 4.0 | 63 |
| Linear lactide polymer [1] | 2.0 | 59 |
| Cyclic lactide polymer [2] | 2.0 | 63 |
| Tetramethyl-1,3-butane-dione | 3.26 | 63 |
| Benzil | 5.7 | 58 |
| Benzoin | 5.8 | 47 |
| 1,3-cyclohexanedione | 3.4 | 72 |
| p-Quinone | 3.0 | 71 |
| Dimedone | 3.85 | 74 |
| 1,3-di-OH-propanenone | 2.6 | 66 |
| dl camphor | 4.2 | 56 |
| Dehydroacetic acid | 4.6 | 57 |
| 2,5-dicarbethoxy-1,4-cyclohexanedione | 3.5 | 74 |
| Acetoacetic ester | 3.6 | 68 |
| Butyl pyruvate | 4.0 | 61 |
| Triglycol dichloride | 2.6 | 61 |
| Benzyl chloride | 3.5 | 63 |
| p-Xylene dichloride | 4.8 | 60 |
| Alpha,alpha,alpha-trichlorotoluene | 1.8 | 54 |
| 1,4-bis (trichloromethyl) benzene | 1.45 | 52 |
| Aniline hydrochloride | 3.4 | 50 |
| Dianiline-1,5-napthalene-disulfonate | 6.5 | 54 |
| Zn p-toluenesulfonate | 5.6 | 68 |
| Zn benzenesulfonate | 4.7 | 56 |
| Na 2-formyl benzenesulfonate | 5.6 | 57 |
| Tetraethyl orthosilicate | 5.7 | 61 |
| Tetra (2-ethylhexyl) orthosilicate | 13.2 | 74 |
| Tetra (2-ethylbutyl) orthosilicate | 10.1 | 77 |
| Tri-isodecylorthoformate | 12.0 | 70 |
| Vinyltriethoxy silane | 5.3 | 50 |
| 2-NO$_2$-2Me-1,3-propanediol sulfite | 5.0 | 59 |
| m-Phenylene diisocyanate | 4.9 | 68 |
| Phenylisothiocyanate | 3.1 | 63 |
| Vinylcyclohexene dioxide | 4.4 | 54 |
| Styrene oxide | 2.7 | 56 |
| Epoxy resin [3] | 12.5 | 56 |
| Isatoic anhydride | 4.5 | 57 |
| Dodecenyl succinic anhydride | 6.9 | 63 |
| Octadecenyl succinic anhydride | 9.2 | 57 |
| Polyglyoxal [4] | 3.3 | 66 |
| Polyvinyl acetate [5] | 2.35 | 57 |
| Dialdehyde starch [6] | 4.5 | 69 |
| Poly(methyl vinyl ketone) [7] | 3.0 | 63 |

Footnotes to Table I:

[1] Linear lactide polymer has the formula:

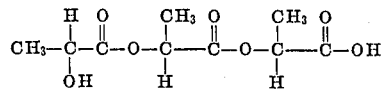

[2] Cyclic lactide polymer has the formula:

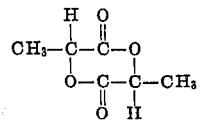

[3] Epichlorohydrin-bisphenol A condensation product, Shell Epon 1001, see U.S. Patent 2,699,042 or 2,936,294.

[4] Polyglyoxal has the formula:

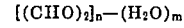

where $n$ is 12 and $m$ is 2; it may be made as described in "General Chemistry of Glyoxal", published by Union Carbide Corporation, 1965, No. F-41296, page 3.

[5] Commercially available linear transparent plastic, unhydrolyzed.

[6] See "The Condensed Chemical Dictionary" 7th edition, Arthur et al., Rheinhold Publishing Corporation 1966, page 289; commercially available as "Sumstar-R".

[7] Clear, brittle plastic; may be made as described on pages 181-182 of Preparation Methods of Polymer Chemistry, Sorenson and Campbell, Interscience Publishers, 1961.

Table I shows that cyclohexylamine in the rubber stock (Control B) causes a marked drop in tensile strength of the cord, only 42 percent of the original strength being retained, as compared to 82 percent strength retention when the same stock containing no amine is heat aged (Control A). This deleterious drop in tensile strength is greatly mitigated by adding the various deterioration preventers to the stock, as shown in the Table I.

Having thus described my invention, what I claim and desire to protect by Letters Patent is:

1. A method of making a laminate of polyester textile reinforcement to a rubber stock in which the textile is stabilized against deteriorating effects of heating comprising adding to the stock, prior to lamination with the textile and vulcanizing, a dialkyl oxalate as a deterioration preventing substance in amount effective to prevent said deterioration, and subsequently laminating the said stock to polyester textile reinforcement and vulcanizing the stock.

2. A method as in claim 1 in which said dialkyl oxalate is diethyl oxalate.

3. A laminate resulting from the method of claim 1.

4. A laminate resulting from the method of claim 2.

* * * * *